US012614942B2

(12) United States Patent
Ohira

(10) Patent No.: US 12,614,942 B2
(45) Date of Patent: Apr. 28, 2026

(54) BUSBAR REINFORCEMENT ARRANGEMENT OF MOTOR UNIT

(71) Applicant: TOYOTA JIDOSHA KABUSHIKI KAISHA, Toyota (JP)

(72) Inventor: Kengo Ohira, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 166 days.

(21) Appl. No.: 18/500,353

(22) Filed: Nov. 2, 2023

(65) Prior Publication Data

US 2024/0178714 A1 May 30, 2024

(30) Foreign Application Priority Data

Nov. 29, 2022 (JP) ................................. 2022-190236

(51) Int. Cl.
*H02K 3/28* (2006.01)
*H02K 5/22* (2006.01)
*H02K 7/116* (2006.01)

(52) U.S. Cl.
CPC .............. *H02K 3/28* (2013.01); *H02K 5/225* (2013.01); *H02K 7/116* (2013.01); *H02K 2203/09* (2013.01)

(58) Field of Classification Search
CPC .... H02K 7/116; H02K 7/1163; H02K 7/1166; H02K 2203/09; H02K 5/22; H02K 5/225; H02K 3/28; H02K 3/04; H02K 3/50
See application file for complete search history.

(56) References Cited

U.S. PATENT DOCUMENTS

| | | | | |
|---|---|---|---|---|
| 2005/0085137 A1* | 4/2005 | Hechler | ............... | H01R 9/2433 |
| | | | | 439/709 |
| 2016/0020660 A1 | 1/2016 | Houzumi et al. | | |
| 2016/0190888 A1* | 6/2016 | Kim | ....................... | H02K 3/522 |
| | | | | 310/43 |
| 2019/0149003 A1* | 5/2019 | Ishikawa | .............. | H02K 1/2706 |
| | | | | 310/179 |
| 2019/0207462 A1* | 7/2019 | Uematsu | ................. | H02K 11/33 |
| 2020/0185997 A1* | 6/2020 | Hirasawa | ............. | H02K 21/222 |
| 2020/0336037 A1* | 10/2020 | Naitou | ...................... | H02K 5/22 |
| 2022/0194193 A1* | 6/2022 | Ikemura | .................. | B60K 17/08 |

(Continued)

FOREIGN PATENT DOCUMENTS

| | | |
|---|---|---|
| JP | 2010-206890 A | 9/2010 |
| JP | 2011-35984 A | 2/2011 |

(Continued)

OTHER PUBLICATIONS

JP-2016116294-A translation (Year: 2016).*

*Primary Examiner* — Oluseye Iwarere
*Assistant Examiner* — Nicholas Lee Setzer
(74) *Attorney, Agent, or Firm* — Sughrue Mion, PLLC

(57) ABSTRACT

A motor unit disclosed herein may comprise: a rotor supported rotatably; a stator core facing the rotor in a radial direction; a stator coil disposed on the stator core; and a first busbar having a plate shape and including a base end connected to the stator coil and a distal end including a connection terminal. The first busbar may include a linear section extending along a straight line. The linear section of the first busbar may include a reinforced section where a thickness direction of the first busbar varies along a width direction of the first busbar.

18 Claims, 5 Drawing Sheets

(56)                     References Cited

U.S. PATENT DOCUMENTS

| | | | |
|---|---|---|---|
| 2022/0239178 A1* | 7/2022 | Ogawa | H02K 3/522 |
| 2022/0271577 A1* | 8/2022 | Chou | H02K 5/15 |

FOREIGN PATENT DOCUMENTS

| | | | |
|---|---|---|---|
| JP | 2014-176208 A | | 9/2014 |
| JP | 2016116294 A | * | 6/2016 |
| JP | 2016-208566 A | | 12/2016 |
| WO | 2019/181571 A1 | | 9/2019 |

* cited by examiner

BUSBAR REINFORCEMENT ARRANGEMENT OF MOTOR UNIT

REFERENCE TO RELATED APPLICATIONS

This application claims priority from Japanese Patent Application No. 2022-190236 filed on Nov. 29, 2022. The entire contents of the priority application are incorporated herein by reference.

BACKGROUND ART

Background

A stator including a stator core, coils arranged in a ring shape along a circumferential direction of the stator core, and a busbar unit connecting the coils and an external power source is known. The busbar unit includes a plate-shaped terminal extending in an axial direction of the stator.

Description

SUMMARY

In the above stator, the plate-shaped terminal extends along a straight line. Thus, when vibration is applied to the stator, its amplitude tends to increase in a direction orthogonal to a wide surface of the terminal. The present disclosure provides a technique which improves rigidity of a plate-shaped busbar in a direction perpendicular to its wide surface.

A motor unit disclosed herein may comprise: a rotor supported rotatably; a stator core facing the rotor in a radial direction; a stator coil disposed on the stator core; and a first busbar having a plate shape and including a base end connected to the stator coil and a distal end including a connection terminal. The first busbar may include a linear section extending along a straight line. The linear section of the first busbar may include a reinforced section where a thickness direction of the first busbar varies along a width direction of the first busbar. The thickness direction of the first busbar used herein refers to a direction orthogonal to the plate-shaped busbar. In other words, the thickness direction of the first busbar can be described as a direction along which the plate-shaped first busbar is passed through by the shortest distance.

In the above motor unit, the linear section of the plate-shaped first busbar includes the reinforced section. At the reinforced section, the thickness direction of the first busbar varies along the width direction of the first busbar. Thus, as compared to a section at which the thickness direction is constant along the width direction of the first busbar, a height of a cross-sectional shape of the first busbar at the reinforced section, i.e., a height in a direction orthogonal to the wide surface, is increased. This increases a cross-sectional secondary moment at the reinforced section, by which the rigidity in the direction orthogonal to the wide surface can be improved.

Details and further improvements of the technique disclosed herein will be described in Detailed Description below.

EMBODIMENT

Figure 1:
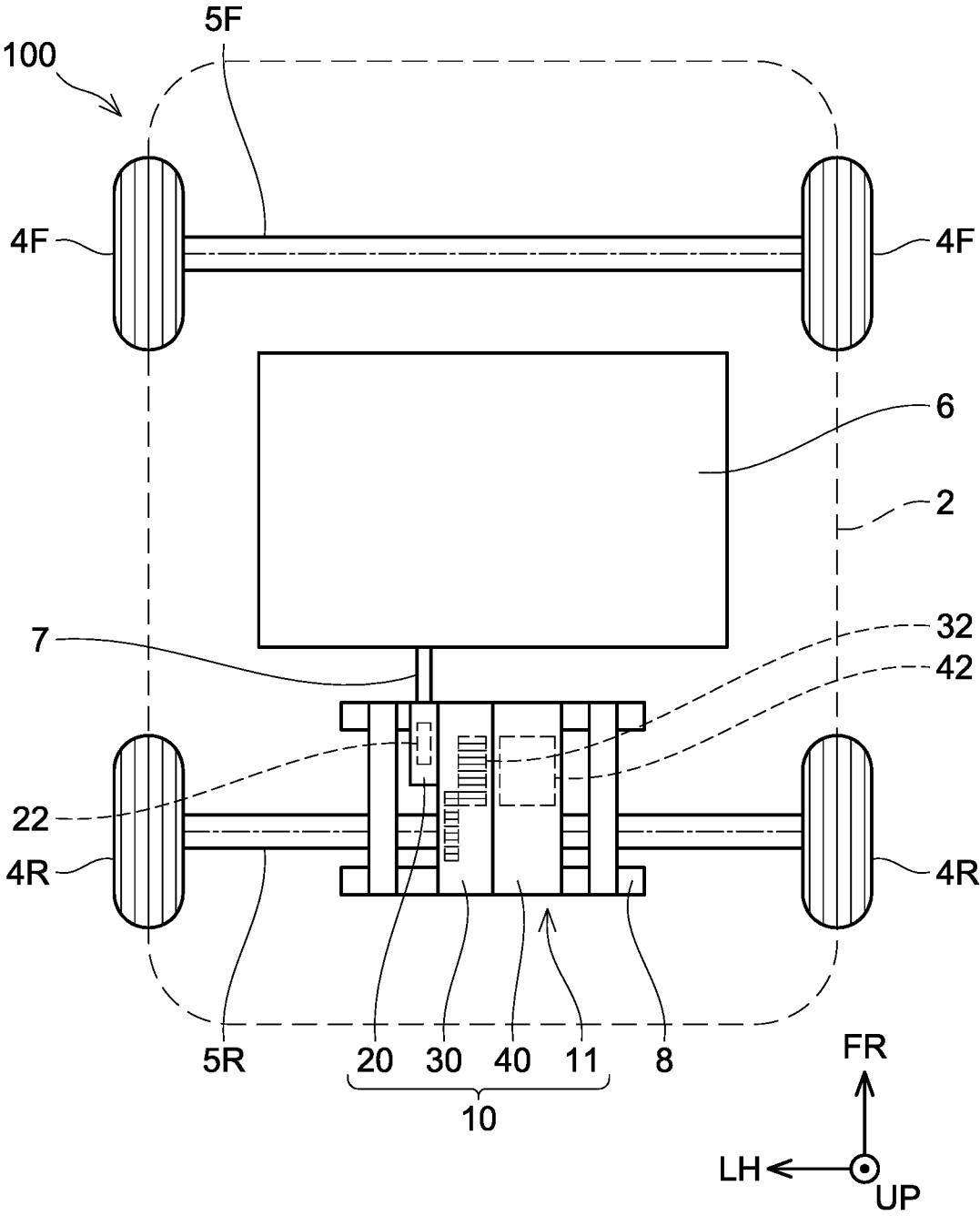
FIG. 1 illustrates a planar view of a vehicle on which a driving device 10 including a motor unit 40 of a first embodiment is mounted.

In one embodiment of the present technique, the linear section may further include a first flat section where the thickness direction of the first busbar is constant along the width direction of the first busbar. In that case, the first flat section may be located between the base end and the reinforced section. With such a configuration, as compared to a configuration in which the reinforced section extends to the base end, the first busbar can easily be connected to the stator coil.

In one embodiment of the present technique, the linear section may further include a second flat section where the thickness direction of the first busbar is constant along the width direction of the first busbar. In that case, the second flat section may be located between the distal end and the reinforced section. With such a configuration, as compared to a configuration in which the reinforced section extends to the distal end, the first busbar can easily be connected to an external device, for example.

In one embodiment of the present technique, the motor unit may further comprise a casing including a partition wall therein. In that case, the base end of the first busbar may be located on one side of the partition wall, and the distal end of the first busbar may be located on the other side of the partition wall. Further, the reinforced section of the first busbar may pass through an opening defined in the partition wall without making contact with the partition wall. With such a configuration, a distance between the partition wall and the reinforced section can be reduced. Therefore, for example, the casing can be downsized.

In one embodiment of the present technique, the linear section of the first busbar extends parallel to a rotation axis of the rotor. It should be noted that, in another embodiment, the linear section of the first busbar may extend in a direction orthogonal to the rotation axis of the rotor.

In one embodiment of the present technique, the motor unit may further comprise a gear connected to the rotor. In that case, the reinforced section of the first busbar may include a recess facing the gear and be configured to receive lubricant splashing from the gear by the recess. Such a configuration increases an area at which the lubricant and the reinforced section come into contact, by which heat of the reinforced section tends to be transmitted to the lubricant.

In one embodiment of the present technique, the motor unit may further comprise a second busbar having a plate shape, a base end of the second busbar being connected to the stator coil and a distal end of the second busbar including a connection terminal. In that case, the second busbar may include a linear section extending along a straight line and the linear section of the second busbar may extend side-byside with the linear section of the first busbar. In another embodiment, however, the motor unit does not need to include the second busbar.

In one embodiment of the present technique, the linear section of the second busbar may include a reinforced section where a thickness direction of the second busbar varies along a width direction of the second busbar. Such a configuration can improve the rigidity of the second busbar.

In one embodiment of the present technique, the motor unit may further comprise a casing including a partition wall therein in which a first opening and second opening are defined. In that case, the base end of the first busbar and the base end of the second busbar may be located on one side of the partition wall. Further, the distal end of the first busbar and the distal end of the second busbar may be located on the other side of the partition wall. In that case, the reinforced section of the first busbar may pass through the first opening disposed in the partition wall without making contact with the partition wall, and the reinforced section of the second busbar may pass through the second opening disposed in the partition wall without making contact with the partition wall. With such a configuration, a distance between the partition wall and the reinforced section of the second busbar can be reduced. Therefore, the casing can be downsized, for example.

In one embodiment of the present technique, the motor unit may further comprise a third busbar having a plate shape, a base end of the third busbar being connected to the stator coil and a distal end of the third busbar including a connection terminal. In that case, each of the second busbar and the third busbar may include a linear section extending along a straight line. Further, the linear section of the third busbar may extends side-by-side with the linear section of the second busbar. It should be noted that, in another embodiment, the motor unit does not need to include the third busbar.

In one embodiment of the present technique, the linear section of the third busbar may include a reinforced section where a thickness direction of the third busbar varies along a width direction of the third busbar. Such a configuration can improve the rigidity of the third busbar.

In one embodiment of the present technique, the motor unit may further comprise a casing including a partition wall therein in which a first opening, a second opening, and a third opening are defined. In that case, the base end of the first busbar, the base end of the second busbar, and the base end of the third busbar may be located on one side of the partition wall. Further, the distal end of the first busbar, the distal end of the second busbar, and the distal end of the third busbar may be located on the other side of the partition wall. In that case, the reinforced section of the first busbar may pass through the first opening disposed in the partition wall without making contact with the partition wall, and the reinforced section of the second busbar may pass through the second opening disposed in the partition wall without making contact with the partition wall. Further, the reinforced section of the third busbar may pass through the third opening disposed in the partition wall without making contact with the partition wall. With such a configuration, a distance between the partition wall and the reinforced section of the third busbar can be reduced. Therefore, the casing can be downsized, for example.

In one embodiment of the present technique, the linear section of the first busbar, the linear section of the second busbar, and the linear section of the third busbar may extend parallel to a rotation axis of the rotor. It should be noted that, in another embodiment, the linear section of the first busbar, the linear section of the second busbar and the linear section of the third busbar may extend in directions intersecting each other.

In one embodiment of the present technique, the linear section of the first busbar, the linear section of the second busbar, and the linear section of the third busbar may be arranged along a circumferential direction which extends about the rotation axis. It should be noted that, in another embodiment, the linear section of the first busbar, the linear section of the second busbar and the linear section of the third busbar may be arranged along a radial direction extending about the rotation axis.

In one embodiment of the present technique, the partition wall may include a first reinforcing rib disposed between the first opening and the second opening and a second reinforcing rib disposed between the second opening and the third opening. In that case, the first reinforcing rib and the second reinforcing rib may be arranged radially about the rotation axis of the rotor. With such a configuration, the first reinforcing rib reinforces the partition wall between the first opening and the second opening, and the second reinforcing rib reinforces the partition wall between the second opening and the third opening. This can suppress the reinforced sections of the busbars passing through the respective openings from coming into contact with the partition walls.

First Embodiment

FIG. 1 shows a schematic diagram of an electric vehicle 100 on which a driving device 10 including a motor unit 40 of a first embodiment is mounted. In addition to the driving device 10, the electric vehicle 100 includes a body 2, a front drive shaft 5F, a pair of front wheels 4F, a rear drive shaft 5R, a pair of rear wheels 4R, a battery pack 6, and a rear suspension member 8. For easier understanding, FIG. 1 shows the body 2 of the electric vehicle 100 by a dashed line. The electric vehicle 100 herein includes a hybrid vehicle and a fuel cell vehicle as well as an electric vehicle. In the coordinate system in the drawings, FR indicates the front of the electric vehicle 100, UP indicates the upper side of the electric vehicle 100, and LH indicates the left side of the electric vehicle 100. In the following, "up", "down", "left", "right", "front" and "rear" are described based on the coordinate system in the drawings.

The pair of front wheels 4F is provided on the ends of the front drive shaft 5F, and the pair of rear wheels 4R is provided on the ends of the rear drive shaft 5R.

The driving device 10 is located below a rear seat (not shown) of the electric vehicle 100 and above the rear suspension member 8. The driving device 10 is configured to drive the pair of rear wheels 4R via the rear drive shaft 5R of the electric vehicle 100. The driving device 10 further includes, in addition to the motor unit 40, an inverter unit 20 and a gear unit 30. The motor unit 40 houses a motor 42. The invertor unit houses an inverter 22. The gear unit 30 houses a gear mechanism 32. As described in detail below, the units 20, 30, and 40 of the driving device 10 each have a case, and adjacent cases are fastened to each other. In a variant, the driving device 10 may be mounted in a front component. In that case, the driving device 10 drives the pair of front wheels 4F via the front drive shaft 5F.

The battery pack 6 is disposed below a floor panel (not illustrated) of the electric vehicle 100. The battery pack 6 is configured to supply power to the driving device 10. Due to this, the driving device 10 drives the pair of rear wheels 4R. The driving device 10 also functions as a power generator. The battery pack 6 stores the power supplied by the driving device 10. The inverter 22 is connected to the battery pack 6 by a power cable 7. The inverter 22 is configured to convert DC power of the battery pack 6 into AC power suitable for driving the motor 42.

Figure 2:
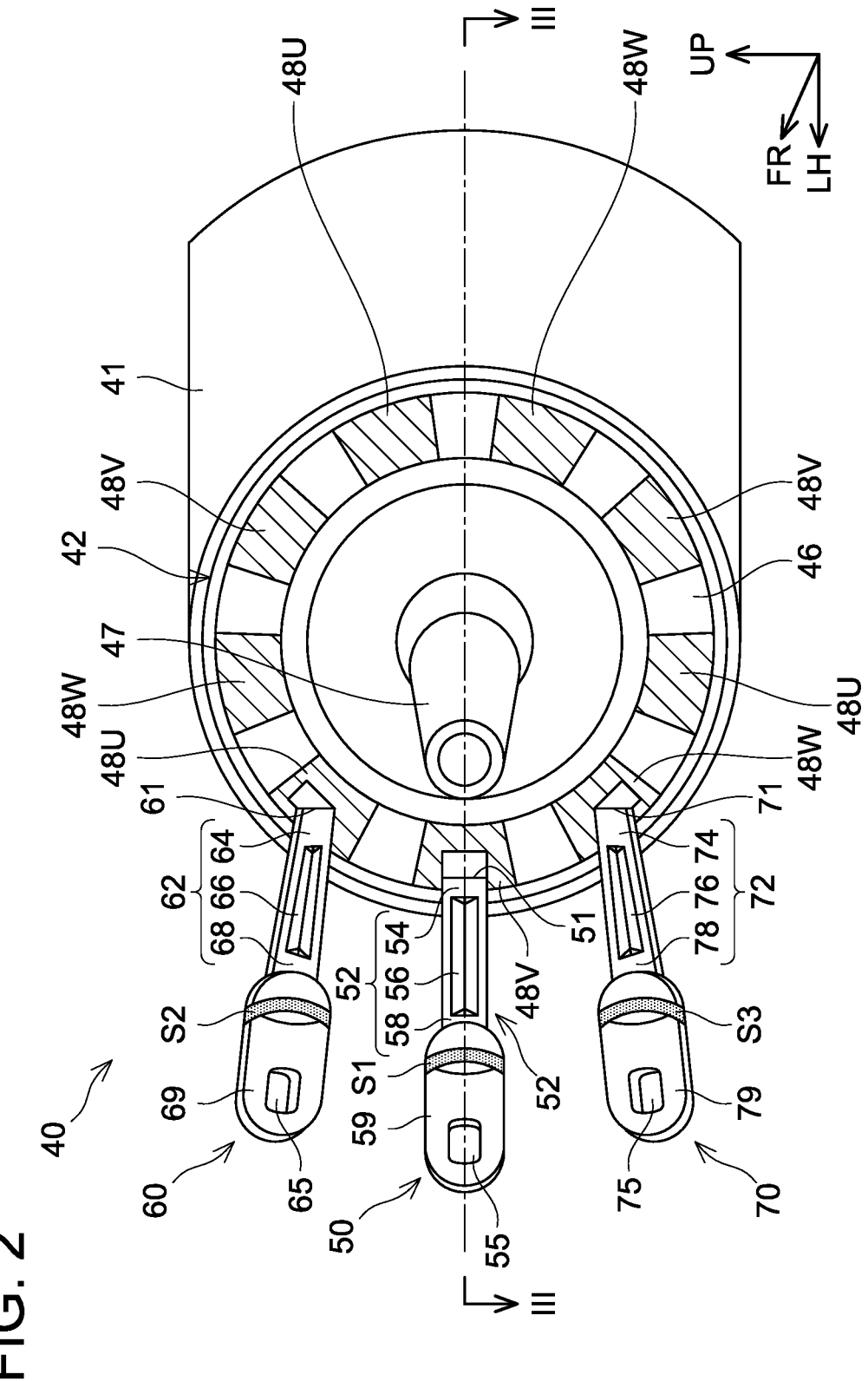
FIG. 2 illustrates a perspective view of the motor unit 40 of the first embodiment.

Referring to FIG. 2, details of the motor unit 40 are described. In addition to the motor 42, the motor unit 40 includes a motor casing 41, a first busbar 50, a second busbar 60, and a third busbar 70. The motor 42 includes a rotor 44 and a stator core 46.

The rotor 44 has a cylindrical shape and extends in a left-right direction along a rotation axis A1. The rotor 44 includes a motor shaft 47 extending leftward along the rotation axis A1. The rotor 44 is constituted of a magnetic material and includes a permanent magnet (not shown) therein.

The stator core 46 has a cylindrical shape and extends in a left-right direction along the rotation axis A1. The stator core 46 is located outside the rotor 44. A space is provided between the stator core 46 and the rotor 44. The stator core 46 faces the rotor 44 in the radial direction of the rotor 44. The stator core 46 is formed of a magnetic material. The stator core 46 includes U-phase stator coils 48U, V-phase stator coils 48V, and W-phase stator coils 48W. Each coil 48U, 48V, and 48W is wrapped around the outer surface of the stator core 46. Each coil 48U, 48V, 48W is arranged in sequence along the circumferential direction about the rotation axis A1. When current flows periodically to each coil 48U, 48V, 48W, magnetic force between each coil 48U, 48V, 48W and the rotor 44 changes. Due to this, the rotor 44 rotates about the rotation axis A1.

A first busbar 50 is connected to the V-phase stator coil 48V. The first busbar 50 is a member for connecting the V-phase stator coil 48V to the inverter 22. The first busbar 50 is constituted of a copper plate. The first busbar 50 includes a first base end 51, a first distal end 59, and a first linear section 52. The first base end 51 is located at the root of the first busbar 50. Specifically, the first base end 51 is located between a portion connected to the V-phase stator coil 48V and the first linear section 52. The first linear section 52 extends parallel to the rotation axis A1 of the rotor 44. The first linear section 52 includes a first flat section 54, a first reinforced section 56, and a second flat section 58. Cross-sectional shapes of the first linear section 52 and each of the flat sections 54 and 58 are different from each other. The cross-sectional shapes of the sections 52, 54, and 58 are described below with reference to FIG. 4. The first distal end 59 is a portion fastened to the inverter 22 and includes a first through-hole 55 and a first sealing member S1. The first sealing member S1 is constituted of an elastic member and is, for example, an O-ring.

A second busbar 60 is connected to the U-phase stator coil 48U. The second busbar 60 has the same structure as the first busbar 50, is constituted of a copper plate, and includes a second base end 61, a second linear section 62, and a second distal end 69. The second linear section 62 of the second busbar 60 extends in the left-right direction along the rotation axis A1. In other words, the second linear section 62 of the second busbar 60 extends side-by-side with the first linear section 52 of the first busbar 50. The second linear section 62 includes a first flat section 64, a second reinforced section 66 and a second flat section 68. The second distal end 69 is a portion fastened to the inverter 22 and includes a second through-hole 65 and a second sealing member S2.

A third busbar 70 is connected to the W-phase stator coil 48W. The third busbar 70 has the same structure as the first busbar 50 and the second busbar 60, is constituted of a copper plate, and includes a third base end 71, a third linear section 72 and a third distal end 79. The third linear section 72 of the third busbar 70 extends in the left-right direction along the rotation axis A1. In other words, the third linear section 72 of the third busbar 70 extends side-by-side with the second linear section 62 of the second busbar 60. The third linear section 72 includes a first flat section 74, a third reinforced section 76, and a second flat section 78. The third distal end 79 is a portion fastened to the inverter 22 and includes a third through-hole 75 and a third sealing member S3.

As shown in FIG. 2, the linear sections 52, 62, and 72 of the busbars are arranged in the circumferential direction about the rotation axis A1. In the motor unit 40, the linear sections 52, 62, and 72 of the busbars extend parallel to the rotation axis A1. Therefore, when viewed along the rotation axis A1, each of the busbars 50, 60, 70 is arranged inside the outer circumference of the motor casing 41 of the motor unit 40. As a result, a size of a casing 11 of the driving device 10 does not become large beyond the outer circumference of the motor casing 41 to accommodate each of the busbars 50, 60, 70. The size of the casing 11 of the driving device 10 can be reduced.

Figure 3:
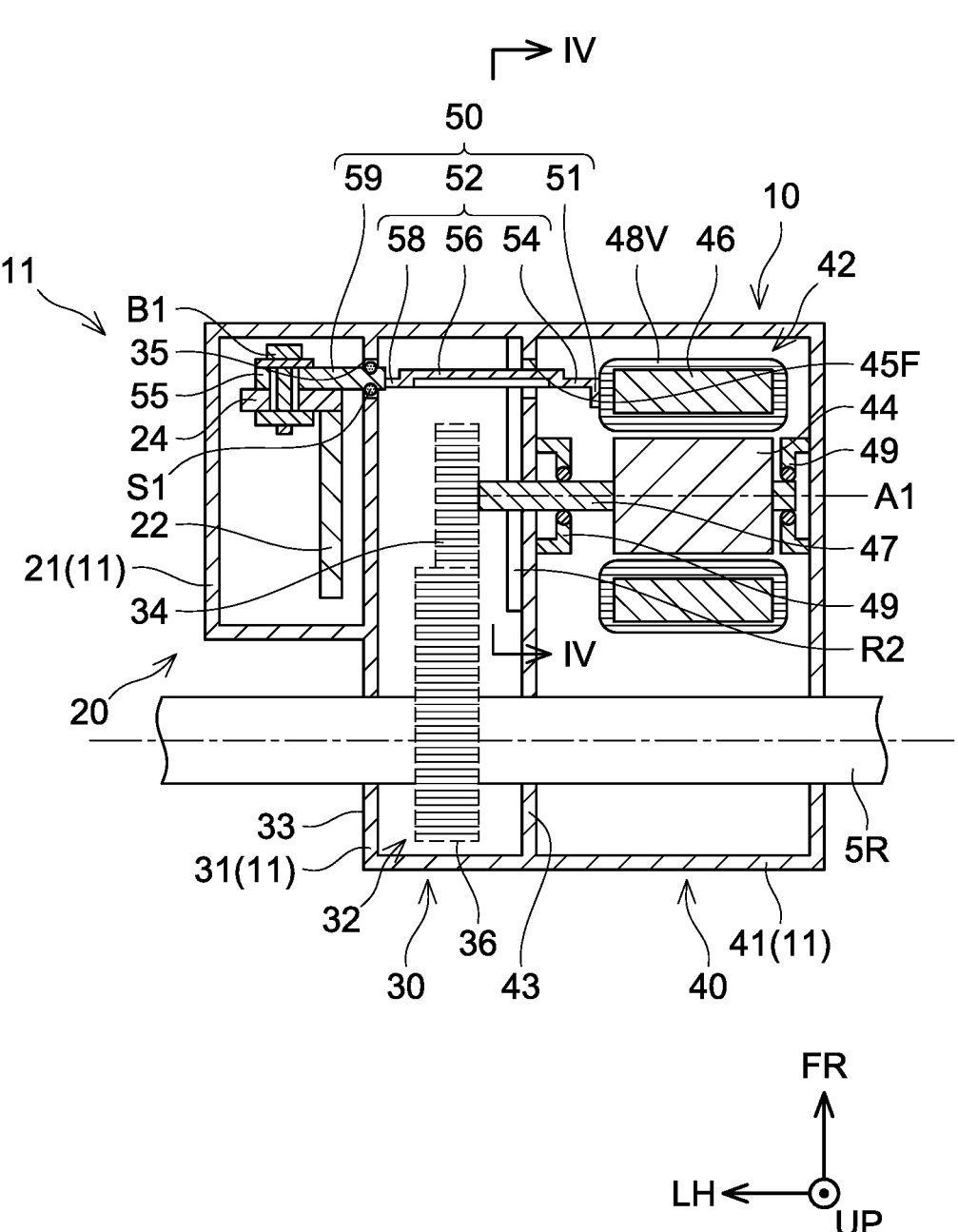
FIG. 3 illustrates a cross-sectional view taken along a line III-III in FIG. 2.

Referring to FIG. 3, an internal structure of the driving device 10 is described. FIG. 3 is a cross-sectional view taken along a line III-III of FIG. 2. In other words, FIG. 3 shows a cross-sectional view of the interior of the casing 11 of the driving device 10 viewed from above. The casing 11 is constituted by the casings 21, 31, and 41 of the units 20, 30, and 40 being fastened to each other.

The motor shaft 47 of the rotor 44 is supported by the motor casing 41 via a pair of bearings 49. In other words, the rotor 44 is supported rotatably about the rotation axis A1 with respect to the motor casing 41.

The motor shaft 47 extends leftward from motor casing 41 to the gear casing 31 and is connected with a link gear 34 of the gear mechanism 32. The link gear 34 is configured to transmit the rotation of the rotor 44 to a differential gear 36 of the gear mechanism 32. Due to this, the rear drive shaft 5R, which is connected to the differential gear 36, rotates. As a result, the pair of rear wheels 4R (see FIG. 1) is driven.

A right partition wall 43 is provided at the boundary between the gear casing 31 and the motor casing 41 of the casing 11. The right partition wall 43 partitions the inner space of the gear casing 31 from the inner space of the motor casing 41. The motor shaft 47 of the rotor 44 and the rear drive shaft 5R extend in the left-right directions through the right partition wall 43. Further, the right partition wall 43 includes a first opening 45F. As shown in FIG. 3, the first busbar 50 is inserted into the first opening 45F.

The first busbar 50 passes through the first opening 45F and extends leftward inside the gear casing 31. The first busbar 50 passes through a through hole 35 in a left partition wall 33 provided at the boundary between the gear casing 31 and the inverter casing 21 of the casing 11, and reaches the inner space of the inverter casing 21. The inner surface of the through hole 35 contacts the first sealing member S1 provided on the first distal end 59 of the first busbar 50. Due to this, the through hole 35 in the left partition wall 33 is sealed.

In the interior space of the inverter casing 21, the rear surface of the first distal end 59 of the first busbar 50 contacts the front surface of a connecting portion 24 of the inverter 22. A bolt B1 is inserted into the first through-hole 55 of the first distal end 59 from the front. The bolt B1 fastens the first distal end 59 of the first busbar 50 to the connecting portion 24 of the inverter 22. Consequently, the first busbar 50 is connected to the inverter 22.

For example, when the driving device 10 vibrates while the electric vehicle 100 travels, the first busbar 50 also vibrates. As described above, the busbar 150 has a constant thickness in the width direction because it is constituted of a plate-shaped member. Generally, rigidity of a plate-shaped member in its thickness direction is relatively small. Therefore, the first linear section 52 of the first busbar 50 of the present embodiment tends to have a large amplitude in the front-rear direction (i.e., the up-down direction in the page of FIG. 3). If the first linear section 52 of the first busbar 50 swings significantly in the front-rear direction, the first linear section 52 of the first busbar 50 may make contact with the inner surface of the casing 11 or the inner surface of the first opening 45F. The "thickness direction" herein means a direction orthogonal to the plate-shaped busbar, in other words, a direction along which the plate-shaped busbar can be sectioned with the shortest distance.

Figure 4:
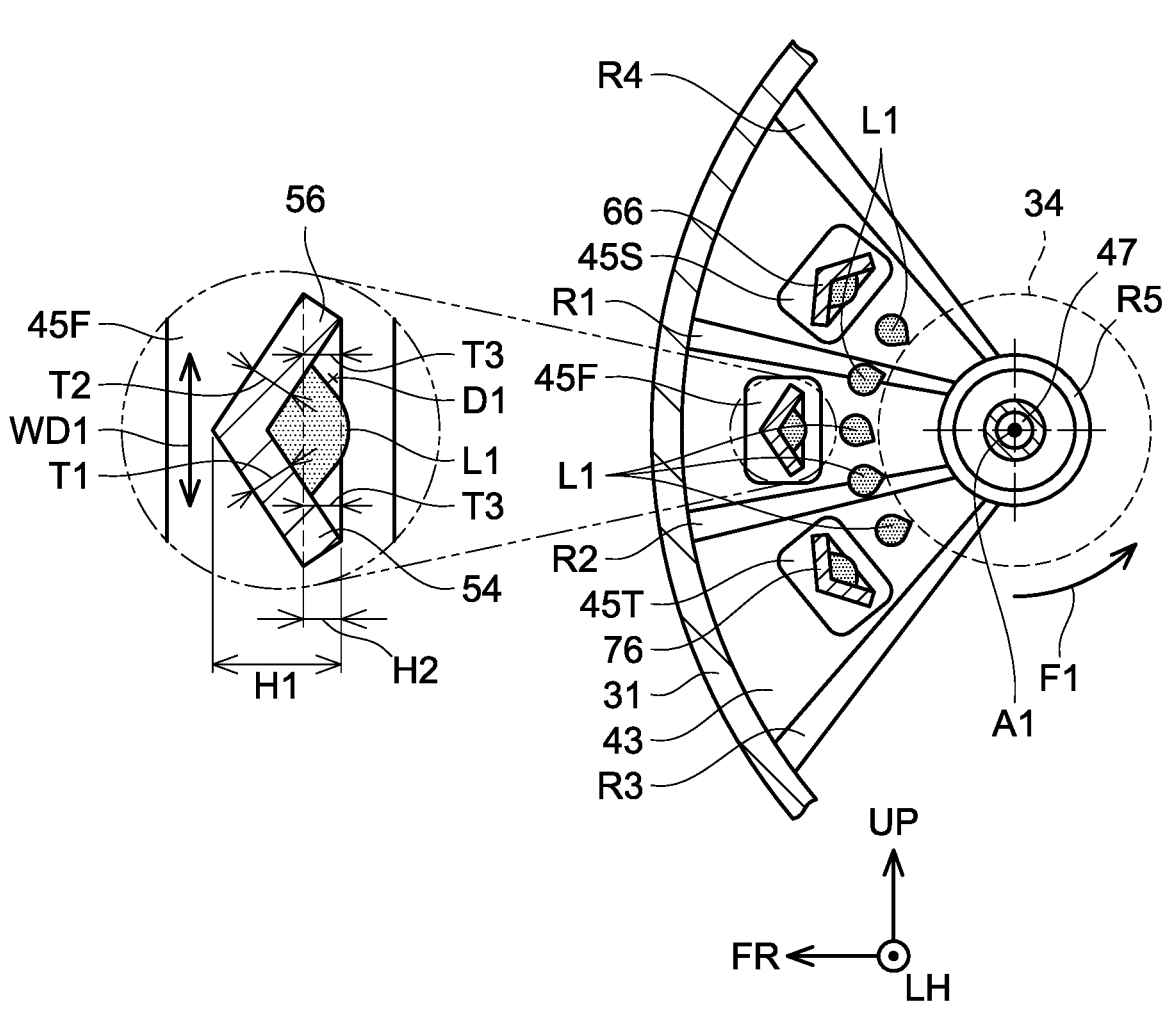
FIG. 4 illustrates a cross-sectional view taken along a line IV-IV in FIG. 3.

Referring to FIG. 4, the cross-sectional shapes of the reinforced sections 56, 66, 76 are described. As shown in the enlarged view on the left side of FIG. 4, the cross-sectional shape of the first reinforced section 56 of the first busbar 50 is bent such that portions closer to the center of the first busbar 50 in the width direction WD1 are displaced more forward. As a result, at a portion lower than the center of the first reinforced section 56 in the width direction WD1, the thickness direction T1 of the first busbar 50 is inclined downward toward the front, and at a portion higher than the center of the width direction WD1, the thickness direction T2 of the first busbar 50 is inclined upward toward the front. In other words, in the first reinforced section 56, the thickness direction of the first busbar 50 varies along the width direction WD1 of the first busbar 50. On the other hand, the cross-sectional shape of the first flat section 54 is not bent. Therefore, in the first flat section 54, the thickness direction T3 is constant along the width direction WD1 of the first busbar 50.

Therefore, in the first reinforced section 56, the height H1 of the cross-sectional shape of the first busbar 50 is larger than the height H2 of the cross-sectional shape of the first flat section 54. As a result, the cross-sectional secondary moment of the first reinforced section 56 in the front-rear direction (i.e., the left-right direction in the page of FIG. 4) is larger than the cross-sectional secondary moment of the first flat section 54. Therefore, the rigidity of the first reinforced section 56 against vibration in the front-rear direction is increased. This can reduce the amplitude of the first straight section 52 of the first busbar 50 in the front-rear direction.

As shown in FIG. 3, the cross-sectional shape of the first linear section 52 of the first busbar 50 switches from the first reinforced section 56 to the first flat section 54 on the right side of the first opening 45F. In other words, the first flat section 54 is located between the first base end 51 and the first reinforced section 56. It is easier to secure a flat surface on the first flat section 54 than the first reinforced section 56. Therefore, the first busbar 50 can be connected to the V-phase stator coil 48V more easily as compared to the configuration in which the first reinforced section 56 extends to the first base end 51.

Similar to the thickness direction T3 of the first flat section 54, the thickness direction of the second flat section 58 is constant along the width direction WD1 of the first busbar 50. Therefore, it is easier to secure a flat surface on the second flat section 58 than the first reinforced section 56. The second flat section 58 is located between the first distal end 59 and the first reinforced section 56. Therefore, the first busbar 50 can be connected to the connecting portion 24 of the inverter 22 more easily as compared to the configuration in which the first reinforced section 56 extends to the first distal end 59.

Furthermore, as shown in FIG. 3, the first base end 51 of the first busbar 50 is located on the right side of the right partition wall 43 provided inside the casing 11. The first distal end 59 of the first busbar 50 is located on the left side of the right partition wall 43. The first reinforced section 56 of the first busbar 50 passes through the first opening 45F defined in the right partition wall 43 without making contact with the right partition wall 43. As a result, the reinforced section 56 of the first busbar 50 faces the inner surface of the first opening 45F. By causing the first reinforced section 56 having a small amplitude to face the first opening 45F, when vibration is applied to the first busbar 50, it is possible to suppress the first reinforced section 56 located in the first opening 45F from making contact with the inner surface of the first opening 45F. Thus, for example, the inner surface of the first opening 45F can be brought closer to the first reinforced section 56 with respect to the front-rear direction. As a result, the casing 11 can be downsized.

As described earlier, the first reinforced section 56 has a bent cross-sectional shape. As a result, as shown in the enlarged view on the left side of FIG. 4, a recess D1 is defined behind the first reinforced section 56. The recess D1 faces the link gear 34 connected to the motor shaft 47 of the rotor 44. Lubricant L1 is applied on the outer surface of the link gear 34. This allows the link gear 34 and the differential gear 36 to rotate smoothly. For example, when the link gear 34 rotates in the direction of an arrow F1 about the rotation axis A1, the lubricant L1 splashes forward. As a result, the lubricant L1 enters the recess D1 facing the link gear 34. Thus, the first reinforced section 56 receives the lubricant L1 splashing from the link gear 34 by the recess D1. Due to this, an area of the first reinforced section 56 at which the first reinforced section 56 makes contact with the lubricant L1 can be increased. Therefore, heat in the first reinforced section 56 is easily transferred to the lubricant L1.

As shown in FIG. 4, each of the reinforced sections 56, 66, 76 is arranged in the circumferential direction about the rotation axis A1. Further, the width direction of each of the reinforced sections 56, 66, 76 is inclined to be tangent to the circumferential direction. In other words, the width direction of each of the reinforced sections 56, 66, 76 is substantially orthogonal to the radial direction about the rotation axis A1. The cross-sectional shape of the second reinforced section 66 of the second busbar 60 and the cross-sectional shape of the third reinforced section 76 of the third busbar 70 are similar to the cross-sectional shape of the first reinforced section 56 of the first busbar 50. In other words, in the second reinforced section 66 of the second busbar 60, the thickness direction of the second busbar 60 varies along the width direction of the second busbar 60, and in the third reinforced section 76 of the third busbar 70, the thickness direction of the third busbar 70 varies along the width direction of the third busbar 70. Due to this, the rigidity of the second busbar 60 and the third busbar 70 in the radial direction can be increased.

In addition to the first opening 45F, a second opening 45S and a third opening 45T are defined in the right partition wall 43. Further, similar to the first reinforced section 56 of the first busbar 50, the second reinforced section 66 of the second busbar 60 passes through the second opening 45S, and the third reinforced section 76 of the third busbar 70 passes through the third opening 45T. Due to this, the inner surface of the second opening 45S can be brought closer to the second reinforced section 66 and the inner surface of the third opening 45T can be brought closer to the third reinforced section 76 with respect to the radial direction. As a result, the casing 11 can be downsized.

As shown in FIG. 4, in addition to the openings 45F, 45S, and 45T, the right partition wall 43 also includes a first reinforcing rib R1, a second reinforcing rib R2, a third reinforcing rib R3, a fourth reinforcing rib R4, and a fifth reinforcing rib R5. Each reinforcing rib R1, R2, R3, R4, and R5 protrudes leftward from the left surface (i.e., out of the page of FIG. 4) of the right partition wall 43.

The fifth reinforcing rib R5 has a cylindrical shape that covers the motor shaft 47 from the outside in the radial direction. Each reinforcing rib R1, R2, R3, R4 connects the outer wall of the motor casing 41 and the fifth reinforcing rib R5. Each reinforcing rib R1, R2, R3, R4 is arranged in the radial direction about the rotation axis A1. The first reinforcing rib R1 is located between the first opening 45F and the second opening 45S. The second reinforcing rib R2 is located between the first opening 45F and the third opening 45T. The third reinforcing rib R3 is located below the third opening 45T and the fourth reinforcing rib R4 is located above the second opening 45S. In other words, the first opening 45F is located between the first reinforcing rib R1 and the second reinforcing rib R2. The second opening 45S is located between the first reinforcing rib R1 and the fourth reinforcing rib R4. The third opening 45T is located between the second reinforcing rib R2 and the third reinforcing rib R3. By arranging the reinforcing ribs between the openings 45F, 45S, and 45T in the radial direction, the rigidity of the right partition wall 43 between the openings 45F, 45S, and 45T is increased. This can suppress the inner surfaces of the openings 45F, 45S, 45T from making contact with the reinforced sections 56, 66, 76, which respectively pass through the openings 45F, 45S, 45T.

Figure 5:
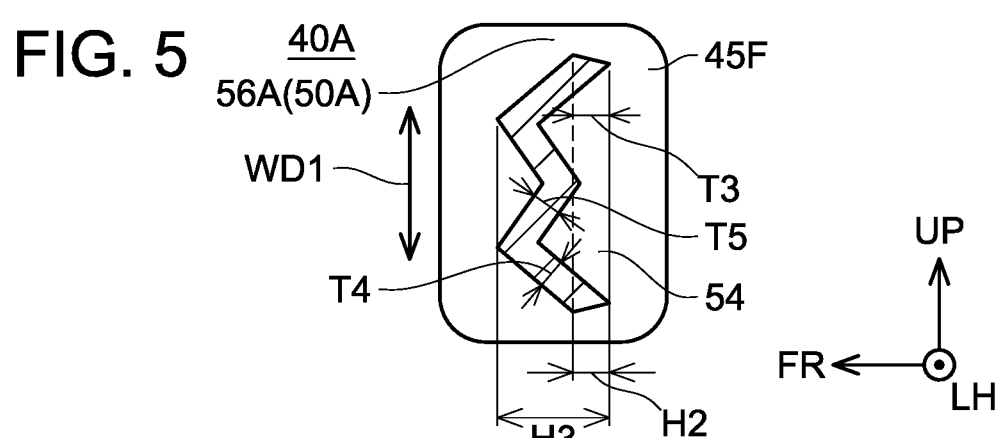
FIG. 5 illustrates a cross-sectional view of a reinforced section 56A included in a motor unit 40A of a second embodiment.
Figure 6:
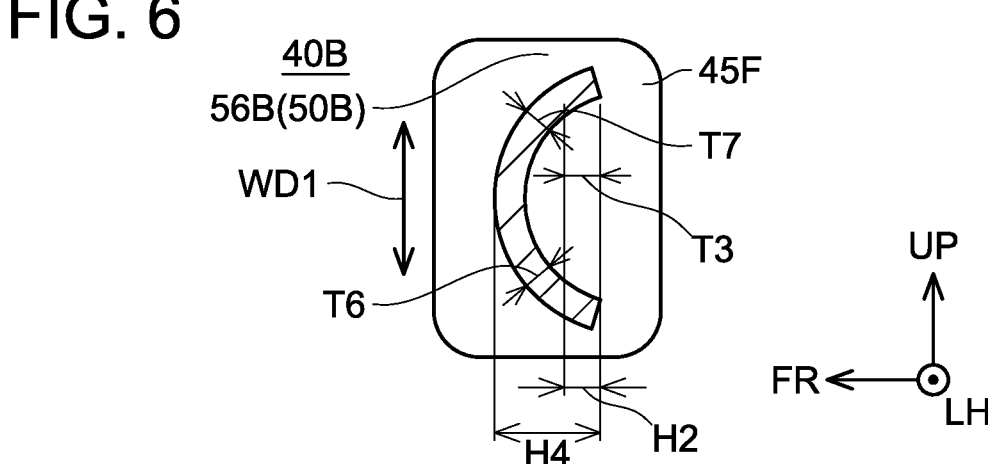
FIG. 6 illustrates a cross-sectional view of a reinforced section 56B included in a motor unit 40B of a third embodiment.
Figure 7:
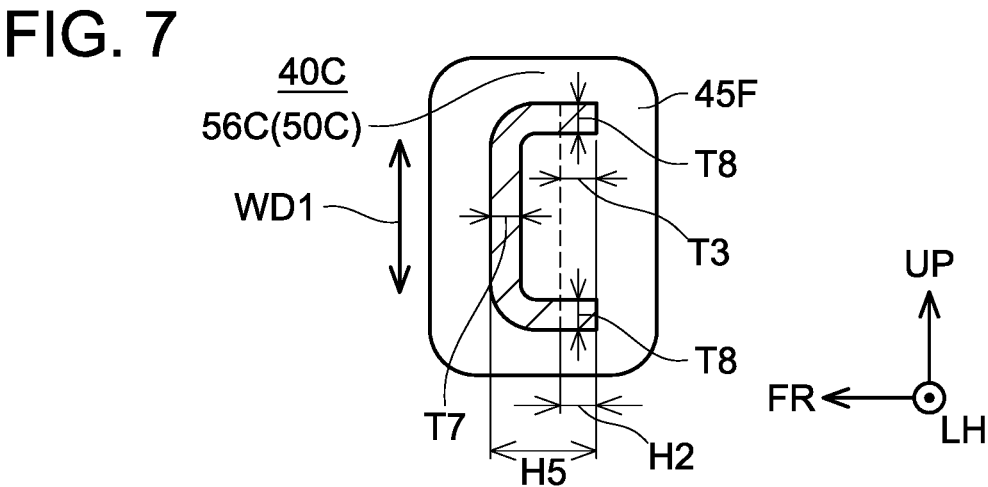
FIG. 7 illustrates a cross-sectional view of a reinforced section 56C included in a motor unit 40C of a fourth embodiment.

Referring to FIG. 5 to FIG. 7, a motor unit 40A of a second embodiment, a motor unit 40B of a third embodiment, and a motor unit 40C of a third embodiment are described. The motor units 40A, 40B, and 40C of the embodiments differ from the motor unit 40 of the first embodiment described above in the cross-sectional shape of the reinforced section of the linear section of the busbar, but otherwise has a similar configuration. Hereafter, cross-sectional shapes of reinforced sections 56A, 56B, and 56C included in the first busbars among the reinforced sections of the busbars included in the motor units 40A, 40B, and 40C of the embodiments will be described.

As shown in FIG. 5, the first reinforced section 56A of the first busbar 50A included in the motor unit 40A of the second embodiment has a cross-sectional shape that is bent multiple times along the width direction WD1. Therefore, below the center of the first reinforced section 56A in the width direction WD1, a portion in which a thickness direction T4 of the first busbar 50A is inclined downward as it is closer to the front and a portion in which a thickness direction T5 of the first busbar 50A is inclined upward as it is closer to the front are formed. The same applies to the portions above the center of the first reinforced section 56A in the width direction WD1. In other words, in the first reinforced section 56A, the thickness direction of the first busbar 50A varies along the width direction WD1 of the first busbar 50A. Therefore, in the first reinforced section 56A, a height H3 of the cross-sectional shape of the first busbar 50A is larger than the height H2 of the cross-sectional shape of the first flat section 54. As a result, the cross-sectional secondary moment of the first reinforced section 56A becomes larger than the cross-sectional secondary moment of the first flat section 54. As a result, the rigidity of the first reinforced section 56A is increased. Due to this, the amplitude of the first linear section 52 of the first busbar 50A can be reduced.

As shown in FIG. 6, the first reinforced section 56B of the busbar 50B included in the motor unit 40B of the third embodiment has a cross-sectional shape curved such that a portion closer to the center in the width direction WD1 bulges more forward. In the first reinforced section 56A, the thickness direction of the first busbar 50A changes from a thickness direction T6 to a thickness direction T7 along the width direction WD1 of the first busbar 50A. Therefore, in the first reinforced section 56B, a height H4 of the cross-sectional shape of the first busbar 50B is larger than the height H2 of the cross-sectional shape of the first flat section 54.

As shown in FIG. 7, the first reinforced section 56C of the busbar 50C included in the motor unit 40C in the fourth embodiment includes a body portion extending in the up-down direction, an upper rim extending in the front-rear direction from the upper end of the body portion, and a lower rim extending in the front-rear direction from the lower end of the body portion. Therefore, in the body portion of the first reinforced section 56C, the thickness direction T7 of the first busbar 50C is along the front-rear direction. On the other hand, at the upper and lower rims, a thickness direction T8 of the first busbar 50C is along the up-down direction. As described above, in the motor unit 40C of the fourth embodiment, the thickness direction of the first busbar 50C varies along the width direction WD1 of the first busbar 50A. Therefore, in the first reinforced section 56C, a height H5 of the cross-sectional shape of the first busbar 50B is larger than the height H2 of the cross-sectional shape of the first flat section 54.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(Variant 1) In the first embodiment described above, the motor unit 40 includes the three busbars 50, 60, and 70, but the configuration is not limited to this, and the motor unit 40 may include only one busbar 50. In a further variant, the motor unit 40 may include two busbars 50, 60, or four or more busbars.

(Variant 2) The first linear section 52 of the first busbar 50 may not include the first flat section 54. In that case, the first reinforced section 56 may extend to the first base end 51.

(Variant 3) The first linear section 52 of the first busbar 50 may not include the second flat section 58. In that case, the first reinforced section 56 may extend to the first distal end 59.

(Variant 4) The right partition wall 43 may not be provided in the casing 11. In that case, the first reinforced section 56 may not pass through the first opening 45F defined in the right partition wall 43.

(Variant 5) The linear sections 52, 62, 72 of the busbars may extend in a direction that intersects the rotation axis A1. In that case, for example, each of the linear sections 52, 62, 72 may extend outward in the radial direction of the motor casing 41.

(Variant 6) The first reinforced section 56 of the first busbar 50 may not include the recess D1. For example, the first reinforced section 56 may include a recess provided on the opposite side of the link gear 34.

(Variant 7) The linear sections 52, 62, 72 of the busbars may be arranged in the radial direction about the rotation axis A1.

The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A motor unit, comprising:

a rotor supported rotatably;

a stator core facing the rotor in a radial direction;

a stator coil disposed on the stator core; and a first busbar having a plate shape and including a base end connected to the stator coil and a distal end including a connection terminal, wherein the first busbar includes a linear section extending along a straight line, the linear section of the first busbar includes a reinforced section where a thickness direction of the first busbar varies along a width direction of the first busbar, and a cross-sectional shape orthogonal to the straight line of the reinforced section comprises a first portion having a first direction as a thickness direction and a second portion having a second direction as a thickness direction, wherein the first direction is different from the second direction.

2. The motor unit according to claim 1, wherein the linear section further includes a first flat section where the thickness direction of the first busbar is constant along the width direction of the first busbar, and the first flat section is located between the base end and the reinforced section.

3. The motor unit according to claim 1, wherein the linear section further includes a second flat section where the thickness direction of the first busbar is constant along the width direction of the first busbar, and the second flat section is located between the distal end and the reinforced section.

4. The motor unit according to claim 2, further comprising a casing including a partition wall therein, wherein the base end of the first busbar is located on one side of the partition wall, the distal end of the first busbar is located on the other side of the partition wall, and the reinforced section of the first busbar passes through an opening defined in the partition wall without making contact with the partition wall.

5. The motor unit according to claim 1, wherein the linear section of the first busbar extends parallel to a rotation axis of the rotor.

6. The motor unit according to claim 1, further comprising a gear connected to the rotor, wherein the reinforced section of the first busbar includes a recess facing the gear and is configured to receive lubricant splashing from the gear by the recess.

7. The motor unit according to claim 1, further comprising a second busbar having a plate shape, a base end of the second busbar being connected to the stator coil and a distal end of the second busbar including a connection terminal, wherein the second busbar includes a linear section extending along a straight line, and the linear section of the second busbar extends side-by-side with the linear section of the first busbar.

8. The motor unit according to claim 7, wherein the linear section of the second busbar includes a reinforced section where a thickness direction of the second busbar varies along a width direction of the second busbar.

9. The motor unit according to claim 8, further comprising a casing including a partition wall therein, in which a first opening and second opening are defined, wherein the base end of the first busbar and the base end of the second busbar are located on one side of the partition wall, the distal end of the first busbar and the distal end of the second busbar are located on the other side of the partition wall, the reinforced section of the first busbar passes through the first opening disposed in the partition wall without making contact with the partition wall, and the reinforced section of the second busbar passes through the second opening disposed in the partition wall without making contact with the partition wall.

10. The motor unit according to claim 7, further comprising a third busbar having a plate shape, a base end of the third busbar being connected to the stator coil and a distal end of the third busbar including a connection terminal, wherein each of the second busbar and the third busbar includes a linear section extending along a straight line, and the linear section of the third busbar extends side-by-side with the linear section of the second busbar.

11. The motor unit according to claim 10, wherein the linear section of the third busbar includes a reinforced section where a thickness direction of the third busbar varies along a width direction of the third busbar.

12. The motor unit according to claim 11, further comprising a casing including a partition wall therein, in which a first opening, a second opening, and a third opening are defined, wherein the base end of the first busbar, the base end of the second busbar, and the base end of the third busbar are located on one side of the partition wall, the distal end of the first busbar, the distal end of the second busbar, and the distal end of the third busbar are located on the other side of the partition wall, the reinforced section of the first busbar passes through the first opening disposed in the partition wall without making contact with the partition wall, the reinforced section of the second busbar passes through the second opening disposed in the partition wall without making contact with the partition wall, and the reinforced section of the third busbar passes through the third opening disposed in the partition wall without making contact with the partition wall.

13. The motor unit according to claim 12, wherein
the linear section of the first busbar, the linear section of
  the second busbar, and the linear section of the third
  busbar extend parallel to a rotation axis of the rotor.

14. The motor unit according to claim 13, wherein
the linear section of the first busbar, the linear section of
  the second busbar, and the linear section of the third
  busbar are arranged along a circumferential direction
  which extends about the rotation axis.

15. The motor unit according to claim 14, wherein
the partition wall includes a first reinforcing rib disposed
  between the first opening and the second opening and
  a second reinforcing rib disposed between the second
  opening and the third opening, and
the first reinforcing rib and the second reinforcing rib are
  arranged radially about the rotation axis of the rotor.

16. A motor unit, comprising:
a rotor supported rotatably;
a stator core facing the rotor in a radial direction;
a stator coil disposed on the stator core; and
a first busbar having a plate shape and including a base
  end connected to the stator coil, a distal end including
  a connection terminal, and a linear section extending
  along a straight line parallel to a rotation axis of the
  rotor and between the base end and the distal end,
  wherein the linear section of the first busbar includes a reinforced
  section, a first flat section, and a second flat section,
  wherein the reinforced section is between the first flat
  section and the second flat section,
a cross-sectional shape orthogonal to the straight line of
  the reinforced section comprises a first portion having
  a first direction as a thickness direction and a second
  portion having a second direction as a thickness direc-
  tion, wherein the first direction is different from the
  second direction, and
a cross-sectional shape orthogonal to the straight line of
  each of the first flat section and the second flat section
  has a different shape than the cross-sectional shape of
  the reinforced section.

17. The motor unit according to claim 16, wherein the
cross-sectional shape of the reinforced section further com-
prises a third portion having a third direction as a thickness
direction, and the third direction is different from the first
direction and the second direction.

18. The motor unit according to claim 16, wherein the
cross-sectional shape of the reinforced section further com-
prises a curved portion extending from the first portion to the
second portion, and a thickness direction of the curved
portion varies continuously from the first direction to the
second direction along the curved portion.

* * * * *